United States Patent Office 3,813,446
Patented May 28, 1974

3,813,446
PRODUCTION OF TRIFLUOROMETHYLNITRO-
PHENOLS AND RELATED COMPOUNDS
Richard L. Jacobs, Perrysburg, Ohio, assignor to The
Sherwin-Williams Company, Cleveland, Ohio
No Drawing. Filed June 24, 1968, Ser. No. 739,143
Int. Cl. C07c 79/24
U.S. Cl. 260—622 R                  8 Claims

ABSTRACT OF THE DISCLOSURE

A method of making trifluoromethylnitrophenols, chloronitrophenols and related compounds which consists of reacting certain halonitrobenzotrifluorides with at least an equimolar amount of an alkali metal or alkaline earth metal thiocyanate, sulfhydrate, or hydroxide and carrying out the reaction in the presence of a solvent medium such as dimethylsulfoxide, dimethylformamide or dimethylacetamide.

BACKGROUND OF THE INVENTION

1. Field of the invention

This invention relates to a method of producing certain trifluoromethylnitrophenols, chloronitrophenols, and related compounds.

2. The prior art

The compounds of the type described above have been prepared in the prior art in tedious, multistep reactions. For example, 2-nitro-4-trifluoromethylphenol has been prepared by reacting 4 - chloro-3-nitrobenzotrifluoride with ammonia to form 4-amino-3-nitrobenzotrifluoride, and then hydrolyzing the aminobenzotrifluoride to form 2-nitro-4-trifluoromethylphenol. Attempts have been made in prior art to obtain trifluoromethylnitrophenols directly from chloronitrobenzotrifluorides and hydroxide ions. In such instances, however, the trifluoromethyl groups were usually hydrolyzed. In no case where the trifluoromethyl group is *ortho* or *para* to the chloro group has a product been obtained in which the hydroxyl ion has replaced the chloro group but left the trifluoromethyl group intact.

A new method has now been discovered which enables the production of the aforedescribed compounds and similar ones in a one step operation.

It is an object of this invention to provide a method of making certain trifluoromethylnitrophenols, chloronitrophenols and related compounds in a one step operation.

Other objects and advantages of this invention will be apparent from the following description.

SUMMARY OF THE INVENTION

The method of this invention comprises:
(1) reacting (A) Compounds having the general formula

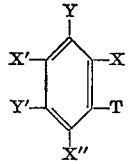

wherein each of X, X', X", is $CF_3$, $NO_2$, or H; Y and Y' are $CF_3$ or H; and wherein at least one of X, X', X", Y and Y' is $CF_3$ and at least one of X, X' and X" is $NO_2$, not more than two of X, X', and X" are $NO_2$ and not more than two of X, X', X", Y and Y' are $CF_3$, and the rest are H; and wherein T is Cl or Br, with (B) at least an equimolar amount of a compound selected from the group consisting of alkali metal and alkaline earth metal thiocyanates, sulfhydrates and hydroxides, said reaction being carried out in a solvent medium of sufficient volume to provide a stirrable slurry, said solvent being selected from the group consisting of dimethylsulfoxide, dimethylformamide and dimethylacetamide, and conducted at a temperature ranging from slightly above the melting point of said solvent to the boiling point of the reaction mixture, and (2) separating the desired product from the reaction mixture.

Examples of halonitrobenzotrifluorides described by the formula set forth in (A) above are 4-chloro-3-nitrobenzotrifluoride, 2-chloro-5-nitrobenzotrifluoride, 4-chloro-3,5-dinitrobenzotrifluoride, and 5 - chloro-2-nitrobenzotrifluoride. Such compounds are known and may be obtained commercially.

The method of the invention may be further illustrated by the reaction scheme illustrated below showing the production of 2-nitro-4-trifluoromethylphenol:

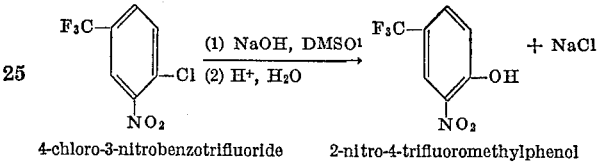

4-chloro-3-nitrobenzotrifluoride    2-nitro-4-trifluoromethylphenol

Also falling within the scope of the invention is the production of certain halonitrophenols. This occurs when the $CF_3$ group in the starting compound is meta relative to the halogen atom. The preparation of 3-chloro-4-nitrophenol is illustrative of this reaction.

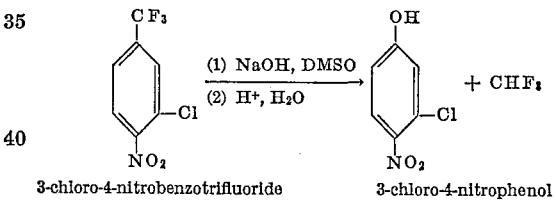

3-chloro-4-nitrobenzotrifluoride    3-chloro-4-nitrophenol

If an alkali metal sulfhydrate such as sodium sulfhydrate is used in the above reaction instead of sodium hydroxide, 2-nitro-5-trifluoromethylthiophenol is produced rather than 3-chloro-4-nitrophenol. This is illustrated as follows:

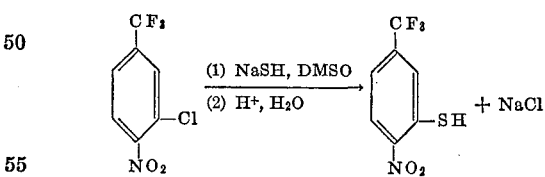

[1] DMSO=dimethylsulfoxide.
[2] As subsequently discussed, the disulfide can also be produced.

Compounds which can be produced by the process of this invention include, for example, 2-nitro-4-trifluoromethylphenol,
4-nitro-2-trifluoromethylphenol,
2,6-dinitro-4-trifluoromethylphenol,
2-nitro-4-trifluoromethylphenylthiocyanate,
4-nitro-3-trifluoromethylthiophenol,
2-nitro-4-trifluoromethylthiophenol,
2,6-dinitro-4-trifluoromethylthiophenol,
2-nitro-4,6-bis(trifluoromethyl)thiophenol,
4-nitro-2-trifluoromethylphenylthiocyanate,
2,6-dinitro-4-trifluoromethylphenylthiocyanate,
4-nitro-3-trifluoromethylphenylthiocyanate, 2-nitro-4,6-bis(trifluoromethyl)phenylthiocyanate,
4-nitro-2,6-bis(trifluoromethyl)phenylthiocyanate,
2-nitro-4,6-bis(trifluoromethyl)phenol,
4-nitro-2,6-bis(trifluoromethyl)phenol,
3-chloro-4-nitrophenol,
bis-(4-nitro-3-trifluoromethylphenyl) disulfide,
bis-(2-nitro-4-trifluoromethylphenyl) disulfide,
bis-(2,6-dinitro-4-trifluoromethylphenyl) disulfide

THE PREFERRED EMBODIMENTS

This invention can be better understood from the following examples which illustrate preferred embodiments of the invention, but the invention is not to be limited thereby.

EXAMPLE I

Preparation of 2-nitro-4-trifluoromethylphenol

A 500 ml. three-necked flask equipped with a stirrer, thermometer, reflux condenser fitted with a calcium chloride drying tube, and a solids addition flask (a 100 ml. one-necked flask connected to the 500 ml. flask via a 6 inch section of ¾ inch Gooch tubing), was charged with 150 ml. dimethylsulfoxide and 112.5 g. 4 - chloro - 3-nitrobenzotrifluoride. A total of 60 g. finely powdered sodium hydroxide was added via the solids addition flask, in small portions, over an eight hour period. The reaction mixture was maintained at [3] 20°–25° throughout the sodium hydroxide addition period. The reaction mixture was stirred for an additional two hours and then set aside overnight without stirring. Next, the reaction mixture was poured onto 300 g. ice in 700 ml. water. The aqueous solution was filtered through diatomaceous silica, and the filtrate was acidified to a pH of 1 with concentrated hydrochloric acid. The red oil which separated was removed, dissolved in 50 ml. ether, dried over anhydrous sodium sulfate. The ether was then removed by distillation at reduced pressure. There remained 100 g. (96.2% yield) product. The infrared spectrum of the product was identical to that for the known compound 2-nitro-4-trifluoromethylphenol.

The dimethylsulfoxide used as a solvent in the above reaction can be replaced by dimethylformamide or dimethylacetamide with substantially equivalent results.

EXAMPLE II

Preparation of 4-nitro-2-trifluoromethylphenol

This reaction was carried out as described in Example I for the preparation of 2-nitro-4-trifluoromethylphenol, except that a charge of 75 ml. dimethylsulfoxide, 56.25 g. 2-chloro - 5 - nitrobenzotrifluoride, and 30 g. powdered sodium hydroxide was employed. The product (20 g., 40% yield) was a yellow solid, and had a melting point of 133°–135° after being recrystallized from a mixture of benzene and petroleum ether. Infrared examination of the product showed the presence of —NO$_2$, CF$_3$—, and —OH groups. (Literature melting point 134°–135° C., J. Org. Chem 27, 4460 (1962)).

Dimethylacetamide or dimethylformamide can be used instead of dimethylsulfoxide as a solvent in the above reaction with substantially equivalent results.

A slight variation in the method of Example II results in the formation of a dimethylsulfoxide adduct of 4 - nitro - 2 - trifluoromethylphenol, rather than production of pure compound. It has been found that when the product is dried by pouring a solution of it over a molecular sieve (to take out water), the final product is the dimethylsulfoxide adduct of 4-nitro - 2 - trifluoromethylphenol. It is not known at what point in the reaction the adduct is formed. It may well be that the adduct is present from the beginning of the reaction and is broken up by normal drying procedures, i.e. using anhydrous sodium sulfate as in Example I; however, for some reason the molecular sieve does not break up the adduct. Regardless of the mechanism, when a molecular sieve is used as a drying means the dimethylsulfoxide adduct is the end product.

Example III demonstrates the preparation of the adduct.

EXAMPLE III

Preparation of dimethylsulfoxide adduct of 4-nitro-2-trifluoromethylphenol

A 250 ml. three-necked flask equipped with a stirrer, thermometer, reflux condenser fitted with a calcium chloride drying tube, water bath, nitrogen atmosphere system, and a solids addition flask (a 100 ml. one-necked flask connected to the 250 ml. flask via a 6 inch section of ¾ inch Gooch tubing), was charged with 75 ml. dimethylsulfoxide and 56.4 g. 2-chloro - 5 - nitrobenzotrifluoride. The nitrogen atmosphere system was activated, and the flask was partially immersed in the water bath. The temperature at this point was 24°. A total of 30 g. finely powdered sodium hydroxide was added via the solids addition flask, in small portions, over a three hour period. The reaction mixture was cooled to and maintained at 15°–20° throughout the sodium hydroxide addition period. The reaction mixture was stirred for an additional seven hours and then let stand overnight without stirring. Next, the reaction mixture was poured into 300 g. ice in 700 ml. water. The aqueous solution was filtered through diatomaceous silica, and the filtrate was acidified to a pH of 1 with concentrated hydrochloric acid. The semi solid matter which separated from the aqueous layer was removed, and extracted with 120 ml. ether, a second time with 100 ml. of ether, then with 100 ml. of chloroform. The chloroform solution was poured over molecular sieves [4] and let stand overnight. The chloroform and ether were then removed by heating in vacuo at 57° and 28 mm. Hg. The yield was 46.1 g. product or 89 percent of theory.

The product was then dissolved in benzene and petroleum ether. Upon standing solids formed in the solution. The liquid was decanted and the residue was filtered to obtain the solids. The solids were then dissolved in 20 ml. of benzene, and the solution was heated at 40°, treated with carbon and then filtered. An equivalent amount of petroleum ether was then charged to the filtrate and the solution let stand. The solution was then filtered, and the solids recovered were washed with a slight amount of petroleum ether and dried. The yield was 4.2 g. of a brownish yellow substance having a melting point of 63.5–64° C. The product was the dimethylsulfoxide adduct of 2 - trifluoromethyl - 4 - nitrophenol believed to have the structure

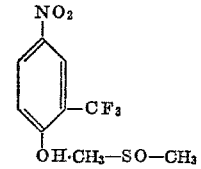

The product was subjected to elemental analysis with the following result.

|   | Theory | Found |
| --- | --- | --- |
| C | 37.897 | 38.19 |
| H | 3.534 | 3.67 |
| N | 4.911 | 4.53 |
| F | 19.981 | 21.09 |

EXAMPLE IV

Preparation of 2,6-dinitro-4-trifluoromethylphenol

A 250 ml. three-necked flask equipped with a stirrer, thermometer, dropping funnel and reflux condenser pro-

---

[3] In the specification and claims all temperatures are expressed in degrees centigrade.

[4] A sieve was used which is commercially available under the designation Linde molecular sieve—Type 4A.

vided with a calcium chloride drying tube, was charged with 100 ml. dimethylsulfoxide and 12 g. finely powdered sodium hydroxide. Next, a dropwise addition of 27 g. 4-chloro-3,5-dinitrobenzotrifluoride [5] was made via the dropping funnel, over a one hour period. External cooling was used to maintain the temperature of the reaction mixture at 20°–25° during the course of this addition. The reaction mixture was stirred for an addtional 3 hours at 20°–25°, and then poured into 500 ml. water. The resulting aqueous solution was filtered and the filtrate was acidified to a pH of 1 with concentrated hydrochloric acid. The viscous red oil which formed on acidification was separated, dissolved in 50 ml. ether and dried over anhydrous sodium sulfate. Removal of the ether by distillation under reduced pressure left a red solid (22.3 g., 92% yield).

The crude product was recrystallized three times from a mixture of ethylacetate and petroleum ether, and had a melting point of 46°–48°. The literature melting point is reported as 47°–48° (Khim, Zur. 21, 81–5 (1955)).

Dimethylformamide or dimethylacetamide can be used instead of dimethylsulfoxide in the above reaction with substantially equivalent results.

EXAMPLE V

Preparation of 2-nitro-4-trifluoromethyl-phenylthiocyanate

A 500 ml. three-necked flask equipped with a stirrer, thermometer, and reflux condenser fitted with a calcium chloride drying tube was charged with 200 ml. dimethylsulfoxide, 112.5 g. 4-chloro-3-nitrobenzotrifluoride, and 72.75 g. potassium thiocyanate. The above mixture was maintained at 45°–50° for 22 hours, heated to 120° over the course of 3 hours and then slowly cooled to room temperature. The reaction mixture was poured into 500 ml. cold water. The yellow solid (87 g., 70% yield) which formed was recrystallized from methanol, and had a melting point of 70°–74°. Examination of the product by infrared techniques showed the presence of the $NO_2$, $CF_3$ and $C \equiv N$ groups. Analysis calculated for $C_8H_3F_3N_2SO_2$: S, 12.9; F, 23.0. Found: S, 12.9; F, 23.19.

EXAMPLE VI

Preparation of 3-trifluoromethyl-4-nitrothiophenol and/or bis-(4-nitro - 3 - trifluoromethylphenyl) disulfide A 500 ml. three-necked flask equipped with a stirrer, thermometer, and reflux condenser, was charged with 100 ml. dimethylsulfoxide and 56.3 g. 5-chloro-2-nitrobenzotrifluoride, and 42 g. sodium sulfhydrate was added in small portions over a 5 hour period, while the reaction temperature was maintained at 25°–30°. The reaction mixture was stirred for an additional hour at 25°–30°, and then poured into 1 liter cold water. The aqueous solution was filtered through diatomaceous silica and the filtrate was acidified with concentrated hydrochloric acid to a pH of 1. The viscous red oil which separated was separated, dissolved in 100 ml. ether, and dried over anhydrous sodium sulfate. Removal of the ether left a red-orange solid (25 g., 45% yield) which was recrystallized from a mixture of benzene and petroleum ether, and which had a melting point of 119°–120.5°. Analysis calculated for $C_7H_4F_3NO_2S$: S, 14.37. Found: S, 14.52. Examination of the product by infrared techniques showed the presence of the —SH, —$NO_2$, and —$CF_3$ groups.

It is possible that the product produced in Example VI is a mixture of compounds, i.e., a mixture of 3-trifluoromethyl - 4 - nitrothiophenol and bis(3-trifluoromethyl-4-nitrophenol) disulfide, or it could be the disulfide instead of the thiophenol. In any event the method of this invention is intended to cover both possibilities.

In carrying out this invention there are a number of processing parameters which must be observed. For example, the reaction must be carried out at a temperature ranging from the melting point of the solvent to the boiling point of the reaction mixture. This will, of course, vary according to which solvent is used. The reaction will naturally go faster when higher temperatures are used.

The preferred solvent for use in the process of this invention is dimethylsulfoxide which has a melting point of approximately 18.4°. When the preferred solvent is being used the reaction is preferably carried out within the temperature range of about 20° to 35°.

Sufficient solvent should be used with the reactants to provide a stirrable slurry. The exact amount is not critical.

It is preferred that the halonitrobenzotrifluoride starting compounds be reacted with the thiocyanate, sulfhydrates or hydroxides above described in at least a 2 to 1 mole ratio in order to get a soluble material upon quenching into water. If less than a 1 to 1 mole ratio is used, the percent yield falls off. More than a 2 to 1 mole ratio can be used if desired; however, no benefits are gained thereby.

As stated herein when there is a $CF_3$ radical metal to the halo radical (halo referring to chlorine or bromine) in the halonitrobenzotrifluoride starting compound, and sodium hydroxide is reacted therewith, replacement of the halo radical does not occur, but rather the $CF_3$ radical is lost and $CHF_3$ is formed. Thus, sodium hydroxide, or any other of the hydroxides mentioned above, cannot be used to replace the halo radical when the $CF_3$ radical is meta thereto.

When NaSH is reacted with a halonitrobenzotrifluoride where the $CF_3$ radical is meta to the halo radical, the $CF_3$ radical is left intact and SH replaces the halo radical. The reason therefor is not precisely known. Any of the other sulfhydrates mentioned above will give the same result.

The second step of this invention, i.e. separation of the product from the reaction mixture is conventional to those skilled in the art. In general this can be accomplished by quenching the reaction mixture in water, followed by acidification to give the free phenol. The phenol is in the form of a solid or oil depending upon the melting point. If it is a solid, it is separated from the reaction mixture by filtration. If it is an oil, it can be separated by extraction using a separator funnel. The product can be purified if desired by either recrystallizing the solid from petroleum ether or the like, or dissolving the oil in ether, drying over anhydrous sodium sulfate, then removing the ether. The exact manner in which this is accomplished is of little consequence.

2-nitro-4-trifluoromethylphenol is useful as an intermediate in the production of azo dyes for textile materials. The preparation of 2-methyl-7-(trifluoromethyl) benzomorpholine (an azo dye) from 2-nitro-4-trifluoromethylphenol [also known as 3-nitro-4-hydroxy (trifluoromethyl) benzene] is described in U.S. Pat. 2,442,-345. The other compounds produced by the instant method are useful because, due to their structural similarities with 2-nitro-4-trifluoromethylphenol, they can be substituted for the 2-nitro-4-trifluoromethylphenol of the indicated patent to investigate their use as intermediates in the production of other dyes.

The compound 3-chloro-4-nitrophenol also produced by the method of the invention is an intermediate used in the production of 3-alkoxy-4-nitrophenols which are in turn used to make dyestuffs. This is disclosed in German Pat. No. 1,178,440. The 3-halo-4-nitrophenols are also disclosed in U.S. Pat. 2,850,537 to be useful as fungicides, or parasiticides.

A useful by-product of the method of the invention is fluoroform ($HCF_3$). The production of fluoroform occurs when there is a $CF_3$ radical meta to the halo

---

[5] In the above reaction the 4-chloro-3,5-dinitrobenzotrifluoride was added last; the reason therefor is to minimize the possibility of fire which can occur because of extreme exothermic reaction where sodium hydroxide is added last in the above reaction.

I claim:

1. A method for conducting a reaction to prepare a member selected from the group consisting of nitrotrifluoromethylphenols, nitrotrifluoromethylphenylthiocyanates, halonitrophenols, nitrotrifluoromethylthiophenols and bis-(nitrotrifluoromethylphenyl) disulfides corresponding to reactant A, below, which comprises reacting
(A) compound having the general formula

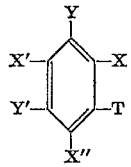

wherein each of X, X', X" is $CF_3$, $NO_2$ or H; Y and Y' are $CF_3$ or H; and wherein at least one of X, X', X", Y and Y' is $CF_3$ and at least one of X, X' and X" is $NO_2$, not more than two of X, X' and X" are $NO_2$ and not more than two of X, X', X", Y and Y' are $CF_3$, and the rest are H; and wherein T is Cl or Br, with (B) at least an equimolar amount of a compound selected from the group consisting of alkali metal and alkaline earth metal thiocyanates, sulfhydrates, and hydroxides, said reaction being carried out in a solvent consisting essentially of one selected from the group consisting of dimethylsulfoxide, dimethylformamide and dimethylacetamide and mixtures thereof and having sufficient volume to provide a stirrable slurry, and conducted at a temperature ranging from slightly above the melting point of the solvent to the boiling point of the reaction mixture and separating the desired product from the reaction mixture.

2. The method of claim 1 in which X is $NO_2$, X' is $CF_3$, X", Y and Y' are H and T is Cl, and wherein (B) is sodium hydroxide and the solvent is dimethylsulfoxide.

3. The method of claim 1 wherein X is $CF_3$, X' is $NO_2$, X", Y and Y' are H, and T is Cl.

4. The method of claim 3 wherein the solvent is dimethylsulfoxide.

5. The method of claim 1 in which X is $NO_2$, X' is $CF_3$, X", Y and Y' are H, and (B) is potassium thiocyanate and wherein the solvent is dimethylsulfoxide.

6. The method of claim 1 wherein X is $NO_2$, X' is $CF_3$, X" is $NO_2$, Y, and Y' are H, T is Cl, and wherein (B) is sodium hydroxide and wherein the solvent is dimethylsulfoxide.

7. A method of preparing 2-nitro-4-trifluoromethylphenol which comprises
(1) reacting 4-chloro-3-nitrobenzotrifluoride with at least an equimolar amount of a compound selected from the group consisting of alkali metal and alkaline earth metal hydroxides, said reaction being carried out in a solvent consisting essentially of one selected from the group consisting of dimethylsulfoxide, dimethylformamide and dimethylacetamide and mixtures and having sufficient volume to provide a stirrable slurry, and being conducted at a temperature ranging from slightly above the melting point of the solvent to the boiling point of the reaction mixture and
(2) separating the desired product from the reaction mixture.

8. The method of claim 1 wherein X is H, Y is $CF_3$, X' and Y' are H, X" is $NO_2$, T is Cl, (B) is NaOH, and the solvent is dimethylsulfoxide.

References Cited
UNITED STATES PATENTS

| 3,167,387 | 1/1965 | Erner | 23—75 |
| 2,196,580 | 4/1940 | Smith et al. | 260—622 R |
| 3,481,991 | 12/1969 | Cohen | 260—629 |

OTHER REFERENCES

Yagupol'skii et al., Chem. Abst., vol. 49, pp. 8866–67 (1955).

LEON ZITVER, Primary Examiner

W. B. LONE, Assistant Examiner

U.S. Cl. X.R.

260—152, 155, 454, 607 R, 608, 609 D, 613 D, 622 P, 653